United ⋯ Patent Office 3,717,608
Patented Feb. 20, 1973

1

3,717,608
POLYMER COMPOSITIONS CONTAINING PERCHLOROFULVALENE
Raymond R. Hindersinn, Lewiston, N.Y., assignor to Hooker Chemical Corporation, Niagara Falls, N.Y.
No Drawing. Continuation-in-part of abandoned application Ser. No. 597,890, Nov. 30, 1966, which is a continuation-in-part of application Ser. No. 184,671, Apr. 3, 1962, now Patent No. 3,475,502. This application Sept. 24, 1968, Ser. No. 762,146
Int. Cl. C08f 27/06, 19/02
U.S. Cl. 260—45.7 R  5 Claims

ABSTRACT OF THE DISCLOSURE

Polymeric uses of perchlorofulvalene include homopolymers of the compound, copolymers with unsaturated monomers, vulcanizable and cured compositions containing the compound, and polymer compositions containing the compound as an additive. Other uses for perchlorofulvalene are in the preparation of light-sensitive reproduction papers, dyestuffs and as an intermediate in the preparation of insecticides.

REFERENCE TO PRIOR APPLICATION

This is a continuation-in-part of copending application Ser. No. 597,890, filed Nov. 30, 1966, now abandoned, which was a continuation-in-part of copending application Ser. No. 184,671, filed Apr. 3, 1962, now U.S. Pat. 3,475,502.

This invention relates to uses for the compound perchlorofulvalene having an empirical formula of $C_{10}Cl_8$ and a decomposition temperature of about 200 degrees centigrade. The compound can be prepared, as disclosed in the aforesaid copending application Ser. No. 184,671, by reacting bis-pentachlorocyclopentadienyl with a solvent at a temperature in the range of about 20 to about 60 degrees centigrade in the presence of anhydrous ferrous chloride. This invention particularly relates to the polymeric uses of perchlorofulvalene. Such uses include the polymerization of the compound itself, the copolymerization of compound with unsaturated monomeric compounds, the use of perchlorofulvalene as an additive in polymer compositions, and the use of perchlorofulvalene as a vulcanizing or cross-linking agent for unsaturated polymers, particularly unsaturated elastomeric polymers.

Perchlorofulvalene is also useful as an ultraviolet light absorber or stabilizer for other materials such as unsaturated polyester resins, particularly halogen-containing unsaturated polyester resins that are susceptible to ultraviolet light instability. The compound is also useful as a dyestuff and as an intermediate in the preparation of insecticides.

Homopolymers of perchlorofulvalene can be prepared by heating the compound at an elevated temperature, for example, in the range of about 100 to 300 degrees centigrade, preferably in the range of about 125 to about 275 degrees centigrade. The polymer is an amorphous yellow solid having an ebullioscopic molecular weight in benzene in the range of about 2,000 to 10,000.

The copolymers of the invention are prepared by reacting perchlorofulvalene with a liquid, ethylenically unsaturated monomeric compound, particularly a vinylic unsaturated compound containing the reactive group $H_2C=C<$ and having from 2 to 20 carbon atoms and preferably 2 to 10 carbon atoms. Specific examples include styrene, α-methyl styrene, vinyl toluene, triallylcyanurate, monochlorostyrene, dichlorostyrene, diallyl phthalate, diallyl maleate, unsaturated esters such as vinyl acetate, methyl methacrylate, methyl acrylate, allyl acetate, diallyl succinate, diallyl adipate, diallyl sebacate, diethylene glycol bis-allylcarbonate, and vinyl chloride, vinyl toluene, diallylchlorendate, diallyltetrachlorophthalate, the lower aliphatic esters other than methyl of methylacrylic and acrylic acids, such as ethylene glycol diacrylate, dimethylacrylate, diethylacrylate, and the like, where the glycol contains from 2 to 6 carbon atoms.

Perchlorofulvalene and the monomer are readily copolymerized in the presence of a catalyst and by heating at an elevated temperature until the desired degrees of polymerization has been obtained. The temperature selection is influenced by the choice of catalyst and the acceptable amount of discoloration for the article being molded. Generally, temperatures from room temperature, e.g., about 20 degrees centigrade, to about 160 degrees centigrade are suitable and excellent cures may be obtained between 50 and 140 degrees centigrade. Time to achieve the desired degree of reaction is dependent upon the temperature and the type and quantity of catalyst employed. Also, it is possible to use cold-curing catalyst systems, i.e., catalytic systems which permit polymerization at ambient temperatures, for example, benzoyl peroxide or p-chlorobenzoyl peroxide in combination with (a) tertiary amines, such as triethylamine, diethylamine, (b) substituted hydrazines, or (c) organometallic compounds such as metallic drying salts, for example, cobalt naphthanate or cobalt octanoate. Unsaturated linear copolymers of the invention can be cross-linked to thermoset products, if desired, by catalytic reaction.

A convenient source of free radicals for reacting blends of perchlorofulvalene with vinylic unsaturated monomers or polymers is obtained by the use of an organic peroxide. These peroxides offer a variety of decomposition temperatures, half lifes, and organic residues. Based on the weight of the monomers present, the amount of peroxide added can be as low as about 0.01 percent and as high as about 5 percent by weight. Preferred polymerization methods and most efficient cures can be obtained by using from about 0.1 to 2.0 percent. Greater amounts of active free radicals will produce shorter chain polymers. Suitable organic peroxides include alkylhydroperoxides, for example, tertiary butyl hydroperoxide, cumene hydroperoxide, diisopropylbenzene hydroperoxide, methane hydroperoxide, and paratertiarybutylcumene hydroperoxide, ditertiarybutyl peroxide, peroxide derivatives of aldehydes and ketones such as hydroxyheptaldehyde, dibenzoyl diperoxide, methylethyl ketone, methylisobutyl ketone, and cyclohexanone peroxides. Among the suitable diacyl peroxides are acetyl peroxide, lauryl peroxide, benzoyl peroxide, parachlorobenzoyl peroxide, and 2,4-dichlorobenzoyl peroxide; and peroxy esters such as tertiary, butyl peracetate, tertiary butyl perzoate, diisopropyl peroxydicarbamate, diperthalate acid and tertiary butyl permaleic acid. Other convenient sources of free radicals for use with the compounds of this invention are the so-called azo catalysts. Catalysts of this group are exemplified by the compound azo bis isobutyronitrile.

Polymerization of perchlorofulvalene with unsaturated monomers can also be carried out with anionic catalysts such as butyl lithium, sodium naphthalene, and the like, cationic catalysts such as aluminum chloride, boron trifluoride, and other Lewis acid catalysts, and coordination catalysts such as combinations of (a) triethylaluminum, triisobutylaluminum, and diethylaluminum bromide, and (b) titanium trichloride, titanium tetrachloride, vanadium trichloride and vanadium tetrachloride.

In accordance with still other aspects of this invention, it is possible to employ the homopolymers and copolymers of this invention in the preparation of plastic articles, reinforced plastic articles, and laminates or other filled resin compositions, and surprisingly, such materials exhibit vastly superior fire retardance and can be rendered self-extinguishing. Castings can also be prepared from the copolymers of the invention and such products likewise may be found to exhibit fire retardance to a surprising degree and may be self-extinguishing. In general, well known processes of the prior art may be used for preparing the above mixed plastic articles, reinforced plastic articles, laminates or other filled resin compositions, and castings, by substituting the copolymer of the present invention for the conventionally used vinyl unsaturated polymer.

Polymer laminates of the invention can be press cured in the conventional manner. Typical examples of good cures include cure cycles of (a) 10 minutes at 80 degrees centigrade followed by 10 minutes at 120 degrees centigrade, and (b) 30 minutes at 90 degrees centigrade followed by 30 minutes at 120 degrees centigrade. Usually, significant changes in fabrication processes are not necessary. It is generally preferred that a thermoset polymer be present in such finished articles.

The following are examples of suitable reinforcing media that can be used with the homopolymers and copolymers of the invention: glass fibers, glass mats, glass cloth, glass roving, synthetic fibers such as acrylonitrile fibers such as E. I. du Pont de Nemours & Company's Orlon brand, mineral fibers such as asbestos, natural fibers such as cotton, silk and wool, and metallic fibers such as aluminum and steel.

The following are examples of fillers that can be used in the homopolymers and copolymers of the invention: inorganic materials such as calcium carbonate, clay and pigments such as zinc oxide, and organic materials such as wood flour, cotton and rayon flock, sisal fibers and dyes.

Further in accordance with this invention, there are provided vulcanizable compositions comprising perchlorofulvalene in combination with sulfur and an elastomeric composition. Preferably from 0.1 to 30 parts of perchlorofulvalene are mixed with sulfur and 100 parts of elastomer, while better products are obtained when the perchlorofulvalene is employed in an amount from 0.5 to 10 parts. Suitably, the amount of sulfur will be between 0.1 and 10.0 parts and preferably from 0.5 to 5.0 parts per 100 parts of elastomer. The resulting mixture is then cured by heating to a vulcanized product. To further improve the process, zinc oxide and metallic accelerators, such as ferric chloride, in various amounts, can be added to the mixture.

The elastomers suitable for use in this invention include polyisobutylene and the nearly amorphous polymers and copolymers of alpha olefins, such as ethylene-propylene copolymers (EPR), ethylene-propylene terpolymers (EPT) which contain minor amounts of conjugated dienes, such as cyclootadiene, and polymers and copolymers derived from other alpha olefins containing 3 to 5 carbon atoms, such as butene-1 and pentene-1. Additionally, polyisobutylene, polybutadiene, ethylene-propylene terpolymers and unsaturated ether polymers are suitable for use with this invention. EPR polymers are very desirable for use in this invention.

The elastomeric composition can be prepared by using conventional compounding and mixing equipment of the rubber manufacturing industry. Ingredients and processing procedures are described in the Vanderbilt Rubber Handbook (6th edition), R. T. Vanderbilt, New York, 1958.

When the elastomeric composition is mixed on a mill, the polymer is banded on the slow roll and perchlorofulvalene and sulfur are added. Cutting and blending the cuts three-fourths of the way across the roll gives uniform mixing. However, the batch should not be cut when dry pigments are present in the rolling bank. Half of the filling pigment is then added, cut and blended into the batch, and then the procedure is repeated for the second half. Softeners, waxes and accelerators may be added in that order. The batch is then cut, blended and refined until it is a uniform composition. Time to complete the mixing is based on the time taken to blend in all of these ingredients properly, and yet not initiate cross-linking of the composition. A typical mixing temperature range for mill mixing of elastomeric compositions is from about 50 to 80 degrees centigrade, while temperatures employed by "internal" mixers may exceed 135 degrees centigrade.

In addition, one can also obtain improved results by subjecting the polymer and the perchlorofulvalene of the invention to an operation called "masterbatching" prior to incorporation of the other ingredients. The compositions of this invention were prepared using the above-described methods.

It is often advantageous to add pigments, oils and other compounding ingredients to the elastomeric composition in order that the most useful properties for a particular application be obtained. The fillers which can be used include various carbon blacks, clay (both hard and soft), silicas, and whitings. The best results are obtained when the semi-reinforcing and high reinforcing furnace and channel blacks, commonly known as super abrasion furnace (SAF), easy processing channel (EPC), semi-reinforcing furnace (SRF), high abrasion furnace (HAF), and medium processing channel (MPC) are used. The amount of filler used generally ranges up to 200 parts by weight, with the preferred amount being from 20 to 75 parts per 100 parts of elastomer.

It is also advantageous to incorporate into the elastomeric composition metallic accelerators, which include the metals, inorganic metallic compounds and the metallic salts of carboxylic acids. Suitable accelerators are metal halides, as well as the oxides and carbonates, and the metallic salts of alkyl mono- and dicarboxylic acids. Preferably, these accelerators include ferrous oxide, ferric oxide, iron chlorides, zinc chloride, aluminum chloride, iron 2-ethylhexoate, iron tallate, zinc stearate and iron distearate. A suitable amount of these accelerators is from 0.1 to 10 parts, preferably 0.5 to 7 parts per 100 parts of elastomer.

After making the mixtures of described components by a process such as that described, the elastomeric composition is made into useful articles by shaping and forming the uncured composition. Thereafter, the article is cured or cross-linked to permanent shape by the application of controlled amounts of heat and pressure, temperatures of 120 to 195 degrees centigrade and pressures of 25 to 1,000 pounds per square inch for 2 to 90 minutes being useful.

Typical normally combustible polymers in which the compound of this invention finds utility as an additive are homopolymers and copolymers of ethylenically unsaturated aliphatic, alicyclic and aromatic hydrocarbons such as polyethylene, polypropylene, polybutene, ethylene-propylene copolymers; copolymers of ethylene or propylene with other olefins, polybutadiene; polymers of butadiene, polyisoprene, both natural and synthetic polystyrene and polymers of pentene, hexene, heptene, octene, 2-methylpropene-1, 4-methylhexene-1, bicyclo-(2.2.1)-2-heptene, pentadiene, hexadiene, 2,3-dimethylbutadiene-1, 3, 4 - vinylcyclohexene, cyclopentadiene, methylstyrene and the like. Other polymers useful in the invention include polyindene, indenecoumarone resins; polymers of acrylate esters and polymers of methacrylate esters, acrylate and methacrylate resins such as ethyl acrylate, n-butyl methacrylate, isobutyl methacrylate, ethyl methacrylate and methyl methacrylate; alkyd resins; cellulose derivatives such as cellulose acetate, cellulose acetate butyrate, cellulose nitrate, ethyl cellulose, hydroxyethyl cellulose, methyl cellulose and sodium carboxymethyl cellulose; epoxy resins; furan resins (furfuryl alcohol or furfural-ketone); hydrocarbon resins from petroleum; isobutylene resins (polyisobutylene); isocyanate resins (polyurethanes); melamine resins such as melamine-formaldehyde and melamine-urea-formaldehyde; oleoresins; phenolic resins such as phenol-formaldehyde, phenolic-elastomer, phenolic-epoxy, phenolic-polyamide, and phenolic-vinyl acetals; polyamide resins such as polyamides and polyamide-epoxy; polyester resins such as polyesters (unsaturated) of dibasic acids and dihydroxy compounds, and polyester elastomer and resorcinol resins such as resorcinol-formaldehyde, resorcinol-furfural, resorcinol-phenol - formaldehyde, resorcinol - polyamide and resorcinol-urea; rubbers such as natural rubber, synthetic polyisoprene, reclaimed rubber, polybutadiene, cyclized rubber, butadiene-acrylonitrile rubber, butadiene-styrene rubber, and butyl rubber; polysulfides (Thiokol); terpene resins; urea resins; vinyl resins such as polymers of vinyl acetal, vinyl acetate or vinyl alcohol-acetate vinyl acetate copolymer, vinyl alcohol, vinyl butyral, vinyl chloride-acetate copolymer and vinyl pyrrolidone; polyformaldehyde; nylon, polycarbonates of dihydroxy compounds such as bisphenols and phosgene, and thermoplastic polymers of bisphenols and epichlorohydrin (trade named Phenoxy polymers); bitumens and asphalts.

The improved fire retardancy of the normally combustible polymers can be improved, if desired, by incorporating metallic compounds such as compounds of arsenic, antimony or bismuth in addition to the perchlorofulvalene in the polymers. Antimony oxide is the antimony compound that is presently preferred for use in the present invention. However, many antimony compounds are suitable. Suitable antimony compounds include the sulfides of antimony, salts of the alkali metals of Group I of the Periodic Table, antimony salts of organic acids and their pentavalent derivatives and the esters of antimonous acids and their pentavalent derivatives. It is convenient to use sodium antimonite or potassium antimonite when it is desired to use an alkali metal salt of the antimony for compositions of this invention. U.S. Pat. 2,996,528 discloses suitable antimony salts of organic acids and their pentavalent derivatives. Compounds of this class include antimony butyrate, antimony valerate, antimony caproate, antimony heptylate, antimony caprylate, antimony pelargonate, antimony caprate, antimony cinnate, antimony anisate, and their pentavalent dihalide derivatives. Likewise, the esters of antimonous acids and their pentavalent derivatives disclosed in U.S. Pat. 2,993,924, such as tris(n-octyl) antimonite, tri(2-ethylhexyl) antimonite, tribenzyl antimonite, tris(beta-chloroethyl) antimonite, tris(beta - chloropropyl) antimonite, tris(beta-chlorobutyl) antimonite, and their pentavalent dihalide derivatives. Still other suitable organic antimony compounds are the cyclic antimonites such as trimethylol propane antimonite, pentaerythritol antimonite and glycerol antimonite. The corresponding arsenic and bismuth compounds can also be employed, in particular the oxides of arsenic and bismuth.

The components comprising the compositions of the instant invention can be mixed by any one of several methods. The perchlorofulvalene and other additives can be introduced into the polymer while the latter is dissolved in a suitable solvent. This procedure is especially useful when it is desired to mix the additives during the polymer manufacturing process. When the polymer is subsequently recovered from the solvent, the additives are intimately mixed with the polymer. Usually, the additives are mixed with the polymer in the molten state at temperatures that can range from the melting point to the decomposition temperature of the polymer. Alternatively, the additives and polymer are dry-blended in the finely divided state so that an intimate mixture is obtained upon subsequent molding or extrusion.

The chlorinated compound of the instant invention is desirably incorporated into polymeric materials in the range from one to about 50 percent by weight of the polymer composition, preferably from about 10 to about 35 percent by weight, and desirably in an effective fire retardant proportion.

Metallic additives are generally employed in a proportion of about one to 30 percent by weight, preferably about 5 to 20 percent by weight. The weight ratio of perchlorofulvalene to metallic additive is preferably about 2 to 1, with the total proportions of fire retardant additive being at least about 15 weight percent of the polymer composition.

The following examples illustrate methods for the preparation and utilization of the compound of this invention, however, they are not to be construed as limiting the invention. Unless indicated otherwise, parts are by weight and temperatures in degrees centigrade.

EXAMPLE 1

Preparation of perchlorofulvalene

A one-liter, three-necked flask equipped with a dropping funnel, a mechanical stirrer, a reflux condenser with drying tube, and a gas inlet tube was flame-dried and filled with dry nitrogen. Anhydrous ferric chloride (47.25 grams) was weighed into the flask and 500 cubic centimeters of distilled anhydrous tetrahydrofuran added rapidly in order to prevent excessive exotherm during the dissolution of the solid. Powdered iron metal (18.0 grams) was then added, and the mixture stirred at reflux under a slow stream of nitrogen for one and one-half hours. A solution of 118.8 grams of bis(pentachlorocyclopentadienyl) in 250 cubic centimeters of anhydrous tetrahydrofuran was added to the stirred mixture over a five-minute period, while still hot, and the resulting dark purple reaction mixture allowed to stand at room temperature for 16 hours.

The tetrahydrofuran was then removed by vacuum distillation and 500 cubic centimeters of a 1:1 mixture of concentrated hydrochloric acid and distilled water were added to the dark, particularly solidified residue. After a few minutes of stirring, 250 cubic centimeters of benzene were added and the stirring continued for 15 to 20 minutes. The black insoluble solid was removed by suction filtration, the cake washed with 800 cubic centimeters of hot benzene, the organic layer separated from the filtrate, and extracted with dilute hydrochloric acid until the acid washes were almost colorless. The organic layer was then concentrated to dryness under vacuum to leave a violet crystalline residue. Recrystallization of the crystalline residue from 430 cubic centimeters of hexane yielded 13.9 grams of $C_{10}Cl_8$ as violet rhombic crystals. A further recrystallization from hexane gave product with the following physical constants:

*Analysis*

Calculated for $C_{10}Cl_8$ (percent): C, 29.75; Cl, 70.25.
Found (percent): C, 29.85; Cl, 69.10.
MW: 431 ebullioscopic in benzene. Theory—404.
UV spectrum: Maximum 389 m$\mu$ log $E$ 4.61.
In hexane: Maximum 603 m$\mu$ log $E$ 2.43.
M.P.: Decomposes at 200 degrees centigrade.
IR spectrum: 6.51$\mu$, 7.95$\mu$, 8.05$\mu$, 8.61$\mu$, 13.03$\mu$, 14.21$\mu$, 14.51$\mu$.

EXAMPLE 2

Preparation of a copolymer

One gram of styrene was mixed with 0.3 gram of $C_{10}Cl_8$ as prepared in Example 1, and 0.1 gram of benzoyl peroxide. This mixture was placed in a sealed test tube and heated at 110 degrees centigrade overnight, followed by a heating period of 6.5 hours at 155 degrees centigrade. The clear, brown, viscous liquid which resulted was dissolved in benzene, and then, precipitated by pouring into 25 cubic centimeters of methanol. The yellow polymer that resulted was reprecipitated as above and dried. This polymer melted into a clear brown solid which was self-extinguishing on ignition.

Chlorine content.—Calculated for the original mixture: 15.7. Found: 14.18.

EXAMPLE 3

Thermal polymerization of $C_{10}Cl_8$

To a weighed 100 cubic centimeter flask equipped with a stop-cock was added 0.508 gram of $C_{10}Cl_8$, and the system was filled with dry nitrogen. The closed container was then heated at 150 to 250 degrees centigrade in an air circulating oven for one hour. The resulting yellow solid was dissolved in 65.5 cubic centimeters of a 45:55 benzene-hexane mixture and the solution chromatographed on a column of 30.0 grams of Florisil (Floridin Co., Warren, Pa.) using 200 cubic centimeters of 55:45 hexane-benzene mixture, 160 cubic centimeters of 25:75 hexane-benzene mixture, 150 cubic centimeters of benzene, 200 cubic centimeters of 50:50 benzene-ether mixture, and 100 cubic centimeters of ether as a diluent. The initial 100 cubic centimeters of 55:45 hexane-benzene diluent was combined and evaporated to dryness to yield 0.30 gram of a yellow amorphous solid with an ebullioscopic molecular weight in benzene of 4700.

EXAMPLE 4

Curing agent for elastomers

Ten parts of ethylene-propylene rubber were milled with 5 parts by weight of high abrasion furnace black, 0.5 part of perchlorofulvalene, 0.1 part of sulfur, 0.5 part by weight of ferric oxide and 0.5 part by weight of tall oil until the mixture was completely homogeneous. The milled stock was then molded in a chrome plated mold in a Carver press at 160 degrees centigrade for 40 minutes with a force of 8,000 pounds per square inch. The cured tough rubber was tested for physical properties and found to have a tensile strength at break of 219 pounds per square inch when measured on a model IP-2 Scott Tester, and a Shore A Hardness of 42:55.

EXAMPLE 5

Fire retardant polymer compositions

The fire retardant nature of perchlorofulvalene was determined by compounding 30 parts of the compound with 70 parts by weight of polypropylene and testing said mixture by the ASTM D635 method modified by hand-molding in a glass tube. The sample had a self-extinguishing time of 67 seconds. A sample of unmodified polypropylene is not self-extinguishing by this test.

EXAMPLE 6

Fire retardant polymer compositions

Polymer compositions were prepared by dry blending polypropylene with perchlorofulvalene and antimony oxide and extruding the resulting mixture. Various proportions of the fire retardant additives were employed and specimens of the compositions were tested for fire retardance in accordance with ASTM test D635-56T, modified by employing a one-eighth inch diameter sample and by holding the flame in a vertical position and tangential to the end of the test specimen. The following results were obtained.

| Parts by weight | | | Fire retardance (seconds) |
|---|---|---|---|
| Plyopropylene | Perchlorofulvalene | Antimony oxide | |
| 70 | 20 | 10 | 1.5 |
| 77.5 | 15 | 7.5 | 2 |

EXAMPLE 7

Photo reproduction paper

Ten parts by weight of perchlorofulvalene were dissolved in 148 parts by weight of chloroform and the resulting mixture was employed to coat the surface of the paper. The paper was dried. Thereafter, an opaque object was placed on the treated surface of the paper. The paper was exposed to ultraviolet radiation for 27 minutes, during which time the exposed portion of the treated paper decolorized. The opaque object was removed and the paper bore a clear imprint of the opaque object.

In additional tests, the proportion of perchlorofulvalene was decreased to 1 part by weight in 148 parts by weight of chloroform and the light exposure time was reduced to 15 minutes. Using these conditions, dark impressions of opaque objects were formed on the treated papers indicating the utility of perchlorofulvalene in the preparation of light sensitive reproduction papers.

Generally, paper is treated by coating the surface of the paper with a solution of perchlorofulvalene in a suitable solvent such as a halocarbon, e.g., chloroform. The proportion of perchlorofulvalene in the solution can be in the range of 0.005 to 10 weight percent.

Various changes and modifications can be made in the compositions and methods of the invention, certain of which preferred forms have been described herein, without departing from the spirit and scope of the invention.

I claim:

1. A polymer composition having perchlorofulvalene combined therein selected from the group consisting of a copolymer of perchlorofulvalene and styrene, and an admixture of ethylene-propylene rubber and perchlorofulvalence, wherein said perchlorofulvalence is a chlorocarbon of the empirical formula $C_{10}Cl_8$ characterized by the property of being a crystalline material with a violet reflectance and having an ultraviolet absorption maximum at 389 millimicrons and 603 millimicrons in hexane.

2. The polymer composition of claim 1 which comprises

2. The poymer composition of claim 1 which comprises a copolymer of perchlorofulvalene and styrene.

3. The composition of claim 1 which comprises ethylene-propylene rubber and perchlorofulvalene.

4. A composition of claim 1 which comprises ethylene-propylene rubber, perchlorofulvalene and sulfur.

5. A composition of claim 1 which comprises a cured reaction product of ethylene-propylene rubber, perchlorofulvalene and sulfur.

References Cited

UNITED STATES PATENTS 3,136,734  6/1964  Wei et al. _____ 260—41
3,328,472  6/1967  Mark _____ 260—648

OTHER REFERENCES

Combustion and Flame, v. 10, 1966, article entitled "Modes of Inhibiting Flammability" by Fenimore et al., pp. 295–301.

Tetrahedron Letters No. 10, 1961, article entitled "Perchlorofulvalene" by Mark, pp. 333–336, Pergman Press Ltd., Great Britain.

Transaction Journal Plastics Inst., December 1965, article entitled "Flame-Retardant Additive in Plastics and Recent Related Patents" by Schmidt, pp. 247–249.

DONALD E. CZAJA, Primary Examiner

V. P. HOKE, Assistant Examiner

U.S. Cl. X.R.

96—88; 106—15 FP; 117—34, 136, 137; 260—2 EP, 8, 17.4, 23 X A, 28, 41 A, 41 B, 41 C, 78.5 CI, 79.5 C, 85.7, 86.3, 88.2, 91.5, 94.9